Jan. 7, 1947.  W. A. FLETCHER  2,413,757
VALVE
Filed Jan. 5, 1944  2 Sheets-Sheet 1
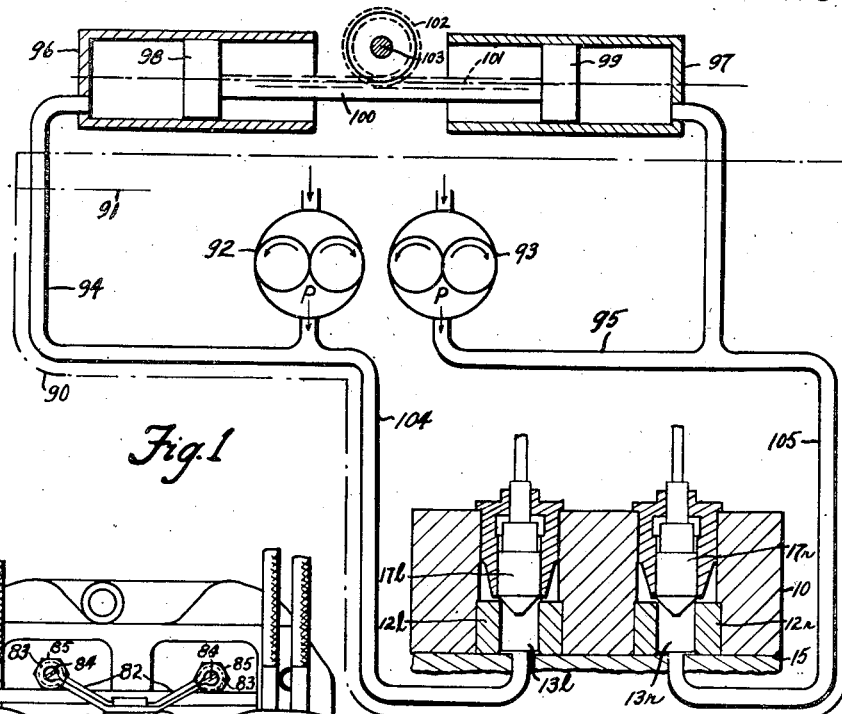
Fig.1
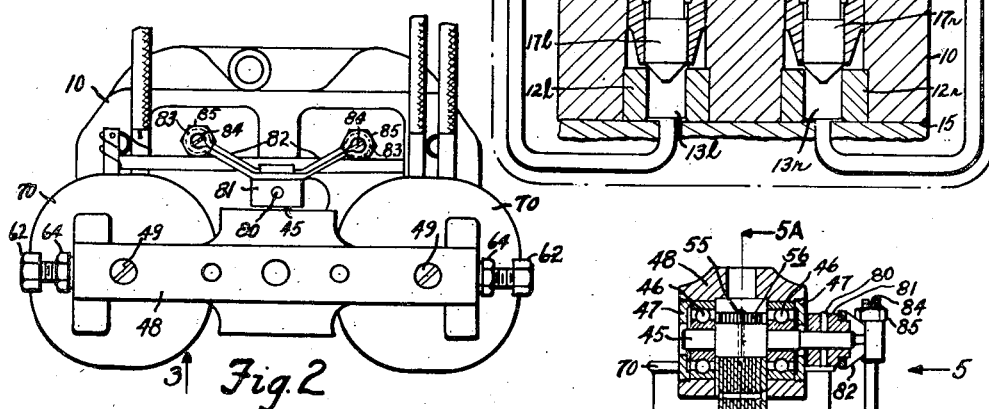
Fig.2
Fig.3
Fig.4
INVENTOR
William A. Fletcher
BY
*Spencer Hardman & Fehr*
his ATTORNEYS Patented Jan. 7, 1947

2,413,757

UNITED STATES PATENT OFFICE 2,413,757

VALVE

William A. Fletcher, Anderson, Ind., assignor to General Motors Corporation, Detroit, Mich., a corporation of Delaware Application January 5, 1944, Serial No. 517,080

5 Claims. (Cl. 137—144)

1

This invention relates to a valve unit for controlling fluid pressure in an hydraulic servo-system which operates, for example, to control the course of an airplane.

It is an object of the present invention to control fluid pressure in accordance with the value of a controlling force of relatively small magnitude, for example, the force of attraction upon a movable armature of an electromagnet responsive to variations in voltages of small magnitude such as used in the automatic-pilot system of airplane control. In the disclosed embodiment of the invention, this object is accomplished by the cooperation of a main valve for controlling the discharge of fluid from the high pressure line to the low pressure side of the hydraulic system, an hydraulic relay having a cylinder which receives pressure fluid from the high pressure line, a piston within the cylinder for applying fluid pressure to force the main valve toward its seat, and means for regulating the pressure in the cylinder in accordance with the magnitude of the controlling force and comprising a duct connecting the cylinder with the low pressure side and passing through a pilot valve seat provided by the main valve, a pilot valve whose movement toward the pilot valve seat is opposed by the pressure of the fluid escaping through the pilot valve seat, and means for applying to the pilot valve, a force for urging it toward its seat. As the controlling force is applied to urge the pilot valve toward its seat, the pressure in the cylinder increases and the main valve approaches its seat to increase the pressure in the high-pressure line. The controlling force continues to move the pilot valve with the main valve until equilibrium status is reached wherein the fluid pressure upon the pilot valve is balanced by the controlling force and the weight of the pilot valve and the fluid pressure acting upon the piston to close the main valve balances the fluid pressure tending to open the main valve. Thus the line pressure maintained by the main valve depends upon the magnitude of the controlling force applied to move the pilot valve toward its seat.

The present valve unit is useful particularly in an automatic-pilot system which provides a signal or controlling force whose magnitude depends on the amount of deviation from a predetermined course. The present valve unit provides for control of operating pressure in accordance with the magnitude of the signal. Therefore the hydraulic servo-apparatus performs in accordance with the magnitude of the signal to make the correction of the position of the steering apparatus required to maintain the course.

Further objects and advantages of the present invention will be apparent from the following description, reference being had to the accompanying drawings wherein a preferred embodiment of the present invention is clearly shown.

In the drawings:

Fig. 1 is a hydraulic diagram including sectional views of valves embodying the present invention.

Fig. 2 is a top view of the electrically operated valve unit embodying the present invention.

Fig. 3 is a view taken in the direction of arrow 3 of Fig. 2.

Fig. 4 is a sectional view on line 4—4 of Fig. 3.

Figure 5:
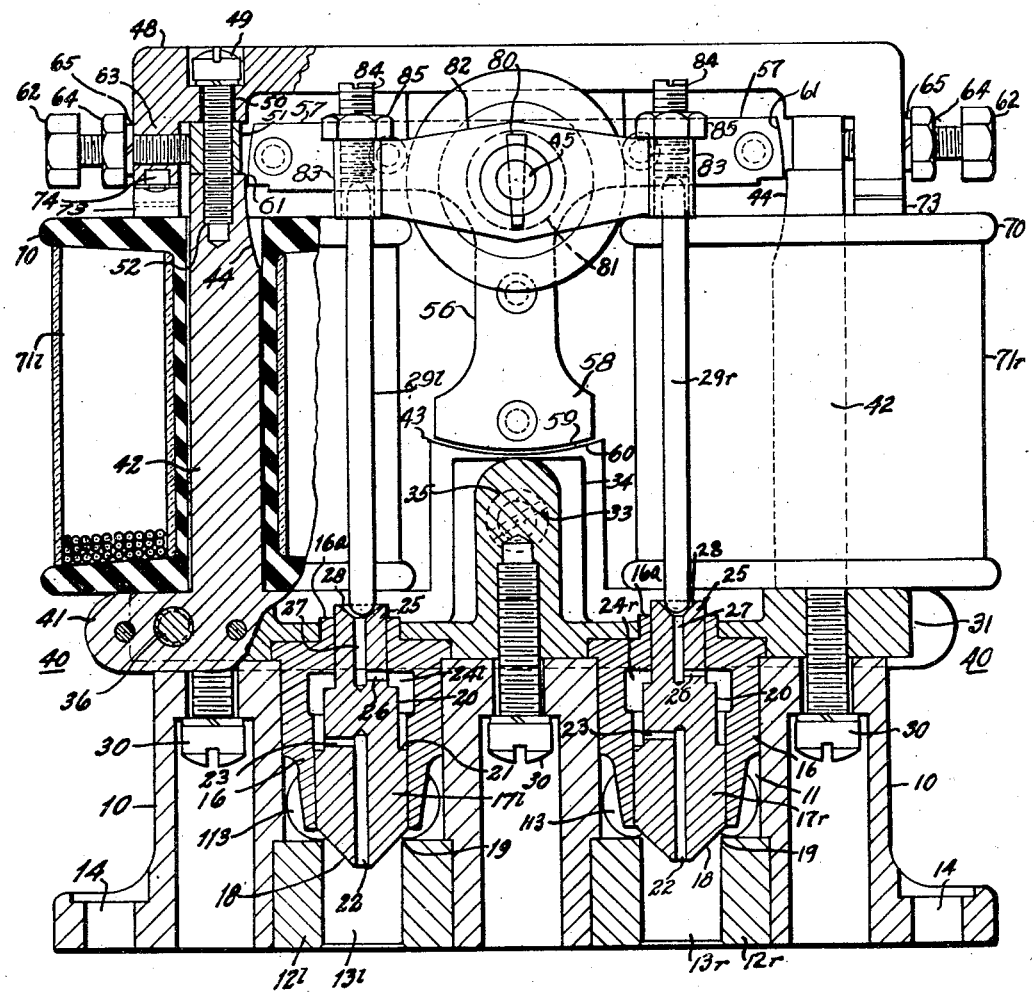
Fig. 5 is a view drawn to a larger scale than Figs. 2, 3 and 4 and is in part a side view looking in the direction of arrow 5 of Fig. 4 and is in part a sectional view taken on line 5A—5A and on line 5B—5B of Fig. 4.

Referring to Fig. 5, a base 10 is provided with cylindrical portions 11 each receiving a valve seat member 12 having a central bore 13. Body 10 is provided with apertured ears 14 each for receiving a screw not shown by which the body 10 may be secured to a plate 15, Fig. 1.

Each cylindrical portion 11 receives a valve guide 16 which receives a valve 17. Each valve 17 has a conically tapered lower end 18 adapted to engage the edge 19 of the valve seat 12. The valve 17 has a portion 20 of reduced diameter providing a shoulder at 21. A passage 22 extends upwardly thru the center of the valve 17 and connects with a passage 23 terminating at the shoulder 21, thus providing communication between the exterior of the valve 17 and a chamber 24 within the valve guide 16 which provides the cylinder with which the valve 17 cooperates as a piston. Valve 17 has another portion 25 of reduced diameter having a sliding fit within an aperture in the upper wall of the valve guide 16. The portion 25 is provided with a side passage 26 connecting with the vertical passage 27 which terminates at a conical valve seat 28 for receiving the spherical lower end of a valve rod 29. To facilitate further description, certain parts such as 12, 13, 17, 24 and 29 which are in the left half of Fig. 5 are given the affix l and those in the right half of Fig. 5 are given the affix r.

Screws 30 secure a plate 31 to the body 10. The plate 31 is provided with apertures each for receiving an annular flange 16a provided by the upper wall of the valve guide 16 which flange surrounds the portion 25 of the valve 17. Plate 31 is provided with a vertical flange 33 which provides a mounting pad 34.

Screws 35 and 36 secured to the mounting plate 31 the laminated core 40 of an electromagnet device which controls the rods 29. The core 40 includes a horizontal base 41, two vertically extending side-branches 42 and a central branch 43. The branches 42 provide arcuate pole faces 44 concentric with the axis of a shaft 45 which, as shown in Fig. 4, is supported by ball bearings 46, retained by plates 47 screw threadedly engaging a frame 48 secured by screws 49 (Fig. 5) to the core branches 42. Each screw 49 passes through a hole 50 in the frame 48 said hole being substantially larger than the threaded portion of the screw. Screw 49 passes through a non-magnetizable spacer block 51 and threaded engages a tapped hole 52 in a core branch 42.

The shaft 45 is connected by pin 55 with a laminated T-shaped armature 56 having side arms 57 and a downwardly extending arm 58 having an arcuate pole face 59 in close proximity to an arcuate pole face 60 provided by the core arm 43, the pole faces 59 and 60 being concentric with the shaft 45. The pole faces 61 of the side arms 57 which are located in close proximity to the pole faces 44 of the core branches 42 are concentric with the axis of shaft 45. The gap between each of the pole faces 44 and the adjacent pole face 61 may be varied by turning a screw 62 threadedly received by a lug 63 provided by the frame 48. To make the adjustment the screw 49 is loosened so as to permit motion between the block 51 and the core 42 relative to the frame 48. The screw 62 is turned in order to push the block 51 and consequently the core branch 42 toward the shaft 45 to reduce the gap between pole faces 44 and 61 and the screw 62 may be turned in the opposite direction to permit the core 42 to move away from the shaft 45 due to the resiliency of the core. After the adjustment of the gap has been made, the screw 62 is secured by lock nut 64 cooperating with a lock-washer 65, and the screw 49 is tightened.

Each core branch 42 is surrounded by a non conducting spool 70 upon which an electro-magnet coil 71 is wound. The spool 70 is urged against the core base 41 by leaf spring 73 carrying a stud 74 received by a recess in lug 63 of a frame 48.

Pin 80 secures to shaft 45 the hub 81, (Fig. 4) of a walking beam lever 82, each end of which is provided with a tubular portion 83 for receiving the upper end of a valve rod 29 and for threadedly receiving a screw 84 for engaging the valve rod 29. By turning the screw 84 the relation between the valve rod 29, the valve 17 and the lever 82 is adjusted. The screw 84 is secured in the desired positions of adjustment by lock nut 85.

Referring to Fig. 1, a valve unit is submerged below the level 91 of pressure fluid contained in a tank 90. Submerged motor driven gear pumps 92 and 93 force pressure fluid from the tank through passages 94 and 95 connected respectively with cylinders 96 and 97 of hydraulic servomotors which include pistons 98 and 99 connected by rod 100 providing a rack 101 meshing with a gear 102 for driving a shaft 103 for operating the device to be controlled which may be, for example, the steering apparatus of an airplane. The passages 94 and 95 are connected by passages 104 and 105 respectively with ports 13l and 13r provided by the left end valve seat 12l and the right hand valve seat 12r. When the valves 17 are in balanced portion as shown in Fig. 1, each valve being elevated the same distance from its seat, the pressure in the cylinders 96 and 97 will be equalized and there will be no movement of the rack 101 and the shaft 103. The valves 17 remain in balanced position so long as the electro-magnetic effects of the two coils 71 are the same, the armature 56 being in symmetrical position, that is, with its arm 58 being vertically located and with its arm 57 horizontally located as shown in Fig. 5. The electrical apparatus for controlling the amount of current flowing in the coils 71 is not shown, but it will be understood by those skilled in the art of automatic controls for aircraft that this apparatus operates, when the airplane departs from a predetermined course, to cause such increase of magnetism of one electromagnet and decrease the magnetism of the other electro-magnet as will result in movement of the shaft 103 to such an extent that the plane will be brought back into its course.

Normally when the electromagnetic effects of magnets 71 are equal, the armature 56 will be located with its arm 57 horizontal (Fig. 5) and the valves 17l and 17r will be located the same distance above their valve seats 12l and 12r as shown in Figs. 1 and 5. The rods 29 exert equal forces upon their seats 28 due to their own weights which are equal. The screws 84 are so adjusted as to provide the proper opening of the valves 17l and 17r when the magnet coils 71 are in balance. Normally the flow of pressure fluid through the high pressure inlets 13 to the low pressure outlets 113 is equal, and valves 17 are located in the same distance above the seats 19 as shown in Figs. 1 and 5. Some pressure fluid flows through each chain of valve passages 22, 23, 26, 27 and out through a valve seat 28 underneath the lower end of a rod 29. When oil is being pumped there is pressure upon the lower ends of the rods sufficient to raise them up against the screws 84, and the valves 17l and 17r are elevated above their seats a distance sufficient to give a certain low balanced pressure. The uninterrupted circulation of oil through passages 22, 23, 26, 27 provides for scavenging any particles of dirt which might be present in the oil in the cylinder 24, and prevents the accumulation of dirt particles in the cylinder. The total pressure force acting upwardly on the valves 17 is balanced by the total pressure force within the cylinders 24 acting downwardly upon the valves 17. The device (not shown) which is responsive to deviation of the airplane from a predetermined course will cause current in one magnet 71 to increase and the current in the other magnet 71 to decrease depending on the direction of deviation. Assuming that the left hand magnet 71l receives more current than the right hand magnet 71r, armature 56 will rotate slightly counterclockwise to cause rod 29l to move down to increase the restriction between the lower end of rod 29l and the adjacent valve seat 28. The pressure in cylinder 24l increases and valve 17l moves down to increase the restriction between the lower end of valve 17l and the adjacent seat 19, and thereby to increase the pressure in passage 13l. As valve 17l moves down armature 56 moves counterclockwise to move the rod 29l against the pressure of fluid escaping at the adjacent seat 28. Equilibrium is established when the total pressure, acting upwardly on the rod 29l equals the weight of the rod 29l plus the force acting downwardly on the rod 29l, which force is due to the differential of the magnetic effects of the magnet coils 71. The greater this differential, the greater will be the total fluid pressure in the cylinder 24l to force the valve 17l down against an equal total fluid pressure acting upwardly through the passage 13l. Thus for each value of force applied magnetically to the rod 29l, there is a corresponding value of total fluid pressure in the passage 13l.

As valve 17l moves toward closed position, valve 17r moves upwardly to effect a reduction in pressure in the passage 13r. As pressure in cylinder 96 (Fig. 1) increases, pressure in cylinder 97 decreases. Pistons 98 and 99 move right to move the steering apparatus in such direction as to cause the airplane to return to the predetermined course. As the deviation from predetermined course diminishes, the current in the coil 7ll diminishes while the current in coil 7lr increases. Valve 17l moves up toward the position shown in Fig. 5 while valve 17r moves down toward the position shown in Fig. 5. Pressure in cylinder 97 increases while pressure in cylinder 96 decreases. When these pressures are equal, movement of the pistons 98 and 99 ceases. When the course of the plane has been restored to the predetermined course, the magnetic effects of the coils 7ll and 7lr are equal and the armature 56 is in normal position as shown in Figs. 3 and 5.

The pistons remain in the position to the right of the symmetrical positions shown in Fig. 1 so long as the steering apparatus is adjusted to maintain the course. If the condition which required movement of the pistons to the right of symmetrical position diminishes in effect, the adjustment of the steering apparatus would be greater than required to effect the deviation from course and there will be a deviation in the opposite direction. When this occurs, coil 7lr will receive more current than coil 7ll; and valve 17r will close while valve 17l opens. Then the pressure in cylinder 97 exceeds the pressure in cylinder 96 and the pistons move left until the steering apparatus is so adjusted as to maintain the predetermined course.

While the pistons 98 and 99 are moving in either direction, there will be a tendency for a change in operating pressure in cylinders 96 and 97, while the magnetic differential remains constant. To offset this the valves 17l and 17r are automatically moved into positions for maintaining the pressure called for by the magnetic effects of the magnets 7ll and 7lr. Assuming that the pressure in passage 13l tends to increase above a certain value corresponding to a certain magnetic differential, the pressure in cylinder 24l begins to increase, and the pressure acting on the lower end of rod 29l begins to exceed the total of the force of gravity on the rod and the magnetically derived force acting thereon. The rod 29l begins moving upwardly and the armature 56 begins to move clockwise. Rod 29l begins moving up to decrease the restriction at the adjacent seat 28, thereby reducing the pressure in cylinder 24l. Valve 17l moves up to reduce the pressure in passage 13l. If the pressure in passage 13l tends to fall below the value which corresponds to a certain magnetic differential, the pressure in cylinder 24l begins to decrease, and the pressure acting on the lower end of rod 29l begins to fall below the total of the force of gravity and the magnetically derived force acting thereon. The rod 29l begins moving down and the armature 56 follows it by a counterclockwise movement. The restriction at seat 28 increases to cause pressure in cylinder 24l to increase and to cause downward movement of valve 17l to increase pressure in passage 13l. Thus the tendency of the pressure in passage 13l to vary is counteracted by a movement of valve 17l into a position of equilibrium such that the pressure in passage 13l will remain constant so long as the magnetic differential of the coils 7ll and 7lr remains constant, regardless of the quantity of fluid moving from the pump 92.

Obviously, the foregoing applies to the control of pressure in passage 13r. Because the control valves are not affected by rate of oil circulation, automatic control of the steering of the plane is very sensitive to deviation from a predetermined course.

While the embodiment of the present invention as herein disclosed, constitutes a preferred form, it is to be understood that other forms might be adopted, all coming within the scope of the claims which follow.

What is claimed is as follows:

1. A valve unit for controlling fluid pressure comprising, in combination, a pressure fluid receiving duct providing a valve seat, a main pressure relief valve cooperating with the seat for controlling the discharge of fluid from the duct, an hydraulic relay controlling the main valve and including relatively movable cylinder and piston members, one of which is fixed and the other of which is connected with the main valve, a duct connecting the first duct with the cylinder, a duct for the discharge of fluid from the cylinder, means for controlling the discharge of fluid from the cylinder through the second duct and including a pilot valve seat movable with the main valve and a pilot valve cooperating with the pilot valve seat and receiving upon its face the pressure of fluid escaping from the cylinder for urging the pilot valve away from its seat and means for applying a controlling force to the pilot valve to urge it toward its seat, whereby in equilibrium status, the pilot valve is in balance between the force urging the pilot valve toward its seat and the pressure fluid force urging the pilot valve away from its seat and whereby, the main valve is in balance between cylinder pressure and fluid pressure acting against the face of the main valve.

2. A valve unit for controlling a fluid pressure in accordance with a controlling force and comprising, in combination, a pressure fluid receiving duct, a control element, apparatus for maintaining the control element in a normal position to obtain a corresponding normal fluid pressure in the duct and sensitive to the operation of a controlling force demanding pressure increase for moving the element to obtain a pressure in the duct corresponding to the magnitude of the controlling force, a main valve seat provided by the duct through which pressure fluid can be discharged from the duct a member providing at one end a main valve cooperating with the main valve seat and providing, at the other end remote from the main valve seat, a pilot valve seat, and providing, intermediate its ends, a piston, a cylinder receiving the piston and guiding the movements of the valve, a duct connecting the first duct with the cylinder whereby fluid pressure is applied to the piston to urge the main valve toward its seat in opposition to fluid pressure in the first duct acting upon the main valve, a duct providing for discharge of pressure fluid from the cylinder and terminating at the pilot valve seat, and a pilot valve positioned between the pilot valve seat and the control element and actuated away from its seat by the pressure of fluid escaping through the seat from the cylinder, the control element limiting said fluid pressure actuated movement of the pilot valve away from its seat thereby controlling the fluid pressure acting upon the piston to urge the main valve toward its seat whereby a certain pressure is normally maintained in the first duct when the control element is in its normal position, and whereby a higher pressure is maintained in the first duct depending on the magnitude of the controlling force urging the pilot valve toward its seat.

3. A valve unit for controlling fluid pressure in accordance with control by opposing forces and comprising, in combination, a pressure fluid receiving duct a control element, apparatus sensitive to the action of two opposing forces for maintaining the control element in a normal position when the forces are equal and for moving the element from normal position when the forces are unequal, a main valve seat provided by the duct through which pressure fluid can be discharged from the duct, a member providing at one end a main valve cooperating with the main valve seat and providing, at the other end remote from the main valve seat, a pilot valve seat, and providing, intermediate its ends, a piston, a cylinder receiving the piston and guiding the movement of the valve, a duct connecting the first duct with the cylinder whereby fluid pressure is applied to the piston to urge the main valve toward its seat in opposition to fluid pressure acting upon the main valve, a duct providing for the discharge of pressure fluid from the cylinder and terminating at the pilot valve seat, and a pilot valve positioned between the pilot valve seat and the control element and actuated away from its seat by the pressure of fluid escaping through the seat of the cylinder, the control element limiting said fluid pressure actuated movement of the pilot valve away from its seat thereby controlling the fluid pressure acting upon the piston to urge the main valve toward its seat whereby a certain pressure is normally maintained in the first duct when the control element is in its normal position, and whereby a higher pressure is maintained in the first duct depending on the magnitude of the force differential urging the pilot valve toward its seat.

4. A valve unit for controlling fluid pressure in accordance with a controlling force and comprising, in combination, a pressure fluid receiving duct, a main valve seat provided by the duct for the discharge of pressure fluid, a main valve cooperating with the seat to limit the flow of fluid therethrough, means for urging the main valve toward its seat and comprising a piston provided by the main valve and a cylinder receiving the piston, a duct connecting the first duct with the cylinder, a duct through the valve communicating with the cylinder and terminating in a pilot valve seat at the end of said member remote from the main valve portion, a pilot valve facing said pilot valve seat, a control element for the pilot valve normally located so as to permit limited movement of the pilot valve away from its seat due to the pressure of the fluid escaping from the cylinder through the pilot valve seat, thereby limiting the escape of fluid from the cylinder so that a pressure is maintained therein such as to cause the main valve to be located in a position permitting such discharge through the main valve seat as to limit the pressure in the first duct to a certain normal value, means for applying a force to move the control element to decrease the gap between the pilot valve and its seat in order to cause the pressure in the cylinder to increase whereby the main valve moves toward its seat to increase the pressure in the first duct, movement of the control element along with the pilot valve and main valve continuing until equilibrium is established between the control force acting upon the control element to urge the pilot valve toward its seat and the force of the pressure of the fluid escaping from the cylinder through the pilot valve seat and acting upon the pilot valve and between the pressure of the fluid in the cylinder acting upon the main valve to urge it toward its seat and the pressure of the fluid at the main valve seat acting upon the main valve, whereby a pressure in the first duct is established depending upon the magnitude of the controlling force.

5. A valve unit for controlling fluid pressure in accordance with a controlling force and comprising, in combination, a pressure fluid receiving duct a main valve seat provided by the duct for the discharge of pressure fluid, a main valve cooperating with the seat to limit the flow of fluid therethrough, means for urging the main valve toward its seat and comprising a piston provided by the main valve and a cylinder receiving the piston, a duct connecting the first duct with the cylinder, a duct through the valve communicating with the cylinder and terminating in a pilot valve seat at the end of said member remote from the main valve portion, a pilot valve facing said seat, a control element for the pilot valve normally located so as to permit limited movement of the pilot valve away from its seat due to the pressure of the fluid escaping from the cylinder through the pilot valve seat, thereby limiting the escape of fluid from the cylinder so that a pressure is maintained therein such as to cause the main valve to be located in a position permitting such discharge through the main valve seat as to limit the pressure in the first duct to a certain normal value, means for positioning the control element and sensitive to two opposing forces which, when equal, cause the control element to be maintained in its normal position, said means being operable in response to a force differential demanding pressure increase in the first duct to move the control element to decrease the gap between the pilot valve and its seat in order to cause the pressure in the cylinder to increase whereby the main valve moves toward its seat to increase the pressure in the first duct, movement of the control element along with the pilot valve and main valve continuing until equilibrium is established between the force differential acting upon the control element to urge the pilot valve toward its seat and the force of the pressure of the fluid escaping from the cylinder through the pilot valve seat and acting upon the pilot valve and between the pressure of the fluid in the cylinder acting upon the main valve to urge it toward its seat and the pressure of the fluid at the main valve seat acting upon the main valve, whereby a pressure in the first duct is established depending upon the magnitude of the force differential.

WILLIAM A. FLETCHER.